(12) United States Patent
Shelton

(10) Patent No.: US 10,577,230 B1
(45) Date of Patent: Mar. 3, 2020

(54) WINCH DEVICE

(71) Applicant: Gary Shelton, Shorewood, MN (US)

(72) Inventor: Gary Shelton, Shorewood, MN (US)

( * ) Notice: Subject to any disclaimer, the term of this patent is extended or adjusted under 35 U.S.C. 154(b) by 0 days.

(21) Appl. No.: 16/166,812

(22) Filed: Oct. 22, 2018

(51) Int. Cl.
*B66D 1/34* (2006.01)
(52) U.S. Cl.
CPC ..................... *B66D 1/34* (2013.01)
(58) Field of Classification Search
CPC ...... B21C 47/30; B65H 49/305; B65H 49/30; B66D 1/28; B66D 1/34
See application file for complete search history.

(56) References Cited

U.S. PATENT DOCUMENTS

| | | | | |
|---|---|---|---|---|
| 994,025 | A * | 5/1911 | Montogomery ....... | B65H 75/24 242/399.2 |
| 1,262,446 | A * | 4/1918 | Caron ................... | B65H 49/30 242/577.4 |
| 1,354,565 | A * | 10/1920 | James .................... | B65H 49/30 242/577.4 |
| 2,300,869 | A * | 11/1942 | Brandes, Jr. ............ | B21C 47/30 242/575.5 |
| 2,370,868 | A * | 3/1945 | Luebke .................. | B65H 75/24 242/407.1 |
| 2,662,703 | A | 12/1953 | Brown | |
| 2,998,094 | A | 8/1961 | Fisher | |
| 3,072,358 | A * | 1/1963 | Knapp ................... | B65D 85/04 242/129 |
| 3,326,495 | A * | 6/1967 | De Bruyn .............. | B65H 75/24 242/577 |
| 3,584,809 | A * | 6/1971 | Ogden, Sr. ........... | B23K 9/1333 242/129 |

(Continued)

FOREIGN PATENT DOCUMENTS

| | | |
|---|---|---|
| CN | 203333214 U | 12/2013 |
| CN | 103569810 A | 2/2014 |
| DE | 2401566 A1 | 7/1975 |

OTHER PUBLICATIONS

DBI SALA "Rope Grab" Hands-Free Mobile Type—Use on ⅝" Rope; ISO 9001.

*Primary Examiner* — Michael E Gallion
(74) *Attorney, Agent, or Firm* — Christensen, Fonder, Dardi & Herbert PLLC; John Fonder

(57) ABSTRACT

A winch device including a spool having a hub rotatable about a hub axis, a first flange at a first end of the hub, a second flange at a second end of the hub, and a plurality of posts including proximal ends and distal ends, wherein each of the posts are offset from the hub axis. The plurality of posts are movable along hub axis such that the spool is selectively configurable back and forth between an open configuration and a closed configuration. When the spool is in the open configuration there is a gap between distal ends of the posts and the second flange. When the spool is in the closed configuration the gap is substantially closed. The spool further includes a biasing member for biasing the spool towards the closed configuration, a first reset motor for effecting movement of the plurality of posts from the closed configuration to the open configuration, and a second motor for effecting axial rotation of the spool about hub axis causing the plurality of posts to rotate radially about hub axis when the spool is in the closed configuration.

20 Claims, 16 Drawing Sheets

(56) References Cited

U.S. PATENT DOCUMENTS

| | | | | |
|---|---|---|---|---|
| 3,661,341 A * | 5/1972 | Eifrid | | B65H 75/14 242/607.1 |
| 3,731,886 A * | 5/1973 | Macchi | | B21C 47/28 242/602 |
| 3,815,842 A * | 6/1974 | Scrogin | | B65H 49/305 242/423.1 |
| 3,836,093 A * | 9/1974 | Mozina | | B65H 75/14 242/118.6 |
| 4,345,724 A * | 8/1982 | Lindell | | B65H 75/20 206/400 |
| 4,953,829 A | 9/1990 | Knaack | | |
| 5,005,777 A | 4/1991 | Fernandez | | |
| 5,025,999 A * | 6/1991 | Littrell | | B65H 54/58 242/577 |
| RE34,376 E * | 9/1993 | Branback | | B65H 49/305 242/129 |
| 5,312,061 A | 5/1994 | McCormick | | |
| 5,346,153 A | 9/1994 | Ebey | | |
| 5,509,620 A | 4/1996 | Crews | | |
| 5,664,766 A | 9/1997 | Baziuk | | |
| 5,704,564 A * | 1/1998 | Neiderman | | B65H 35/0066 242/527.5 |
| 5,779,226 A | 7/1998 | Wudtke | | |
| 5,954,294 A * | 9/1999 | Forsner | | B65H 54/58 242/604 |
| 5,957,433 A | 9/1999 | Fujikawa | | |
| 5,988,095 A | 11/1999 | Kallenberger | | |
| 6,021,974 A * | 2/2000 | Koskelainen | | B65H 54/2896 242/118.62 |
| 6,206,323 B1 * | 3/2001 | Byars | | B65H 54/543 242/127 |
| 6,267,319 B1 * | 7/2001 | Hoffmann | | A62C 33/02 242/395 |
| 6,352,215 B1 * | 3/2002 | Cash | | B21C 47/30 242/574.2 |
| 6,474,582 B2 | 11/2002 | Zwettler | | |
| 6,483,033 B1 | 11/2002 | Simoes | | |
| 6,655,627 B2 * | 12/2003 | Patton | | B65H 49/30 242/397.2 |
| 6,719,241 B2 | 4/2004 | Golden | | |
| 6,923,394 B2 | 8/2005 | Goldstein | | |
| 7,243,877 B1 | 7/2007 | Anderson | | |
| 7,281,679 B1 * | 10/2007 | Jones | | B65H 75/18 242/609 |
| 7,364,108 B2 | 4/2008 | Kim | | |
| 7,918,414 B1 * | 4/2011 | Davis | | B65H 75/28 211/70 |
| 7,996,962 B2 | 8/2011 | Peterson | | |
| 8,047,463 B2 | 11/2011 | Ruggenenti | | |
| 8,177,157 B2 * | 5/2012 | Weissbrod | | B65H 75/22 242/118.6 |
| 8,245,360 B2 | 8/2012 | Stafford | | |
| 8,328,257 B1 | 12/2012 | Coste | | |
| 8,376,297 B2 | 12/2013 | Brickell | | |
| 8,602,161 B2 | 12/2013 | Brickell | | |
| 8,727,262 B2 * | 5/2014 | Underbrink | | B65H 49/24 242/573 |
| 8,820,403 B2 | 9/2014 | Streater, Jr. | | |
| 8,827,687 B2 * | 9/2014 | Schmitt | | G03G 15/2014 242/604 |
| 8,851,238 B2 | 10/2014 | Byers | | |
| 8,853,541 B2 | 10/2014 | Ingram, Sr. | | |
| 8,925,687 B2 | 1/2015 | Meillet | | |
| 8,973,858 B2 * | 3/2015 | Meyer | | B65H 18/021 242/533.4 |
| 9,132,297 B2 | 9/2015 | Casebolt | | |
| 9,242,840 B2 | 1/2016 | Wenner | | |
| 9,243,965 B2 | 1/2016 | Williams | | |
| 9,279,476 B2 | 3/2016 | Bell | | |
| 9,370,685 B2 | 6/2016 | Watry | | |
| 9,387,911 B2 | 7/2016 | Jamieson | | |
| 9,388,025 B2 | 7/2016 | Costa | | |
| 9,394,033 B2 | 7/2016 | Firing | | |
| 9,401,706 B2 | 7/2016 | Tirunagari | | |
| 9,434,583 B1 | 9/2016 | Holttum | | |
| 9,452,365 B2 | 9/2016 | Morgan | | |
| 9,453,527 B2 | 9/2016 | Yoo | | |
| 9,494,183 B2 | 11/2016 | Botti | | |
| 9,511,980 B2 | 12/2016 | Dohse | | |
| 9,517,362 B1 | 12/2016 | Siegel | | |
| 9,528,239 B2 | 12/2016 | Nakayasu | | |
| 9,562,396 B2 | 2/2017 | Baym | | |
| 9,567,814 B2 | 2/2017 | Tambs | | |
| 9,573,511 B2 | 2/2017 | Gaudet | | |
| 9,573,605 B2 | 2/2017 | Steele | | |
| 9,573,660 B2 | 2/2017 | Mol | | |
| 9,573,665 B2 | 2/2017 | Ogen | | |
| 9,586,794 B2 * | 3/2017 | Chung | | B66D 1/30 |
| 9,902,589 B2 * | 2/2018 | Gregory | | B65H 75/446 |
| 9,908,738 B1 * | 3/2018 | Toth | | B65H 49/28 |
| 2005/0116083 A1 * | 6/2005 | Bayer | | B65H 49/305 242/597.7 |
| 2005/0253015 A1 * | 11/2005 | Bohnisch | | B65H 49/30 242/578 |
| 2009/0308826 A1 * | 12/2009 | Kempf | | B66C 9/02 212/270 |
| 2011/0198430 A1 * | 8/2011 | Rothell | | B65H 49/305 242/401 |
| 2013/0334479 A1 | 12/2013 | Yoder | | |
| 2014/0124719 A1 | 5/2014 | Wiley | | |
| 2016/0083231 A1 * | 3/2016 | Xiao | | B66D 1/28 29/592 |
| 2017/0327355 A1 | 11/2017 | Mupende | | |

* cited by examiner

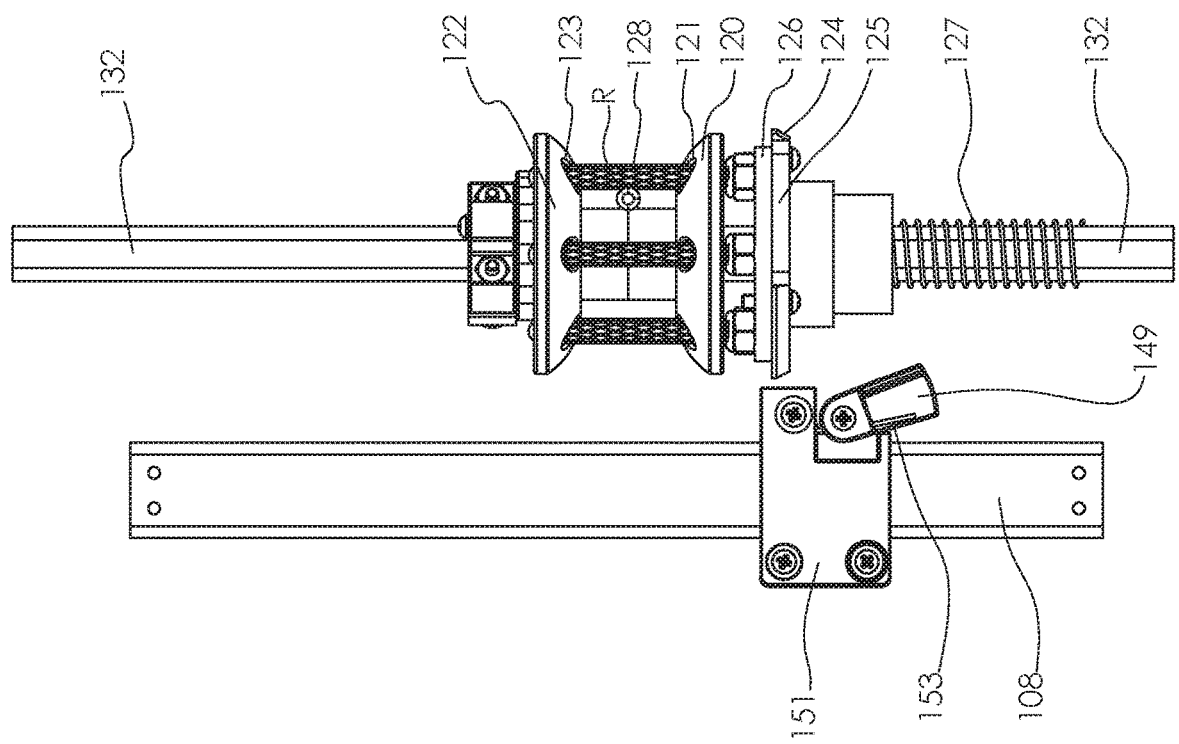

WINCH DEVICE

FIELD

The present disclosure generally relates to winch devices and, more particularly, to a winch that can selectively attach to a flexible strand at various points along a length thereof.

BACKGROUND OF THE DISCLOSURE

Winches are commonly-used mechanical devices that can be used to wind up or let out rope, cable, chain, cord, wire, straps, or other flexible members or strands. Such devices can include a spool, hub, or drum and a mechanism for winding up or letting out the flexible strand. Such mechanisms can be manual, such as a crank or reel, or electronically operated, such as with a motor or other electromechanical device.

With winches, the flexible strand is typically connected to the spool at or near an end of the flexible strand. For example, an end of the flexible strand can be tied to itself or otherwise coupled or fixed to structure included in the drum. Such structures can include a bolt on a flange of the drum to which a user can attach an end of the rope, which can include a loop formed directly into (or spliced onto) the rope itself. In other devices, the drum can include a slot extending through the drum, through which an end of the rope can be passed and coupled to the drum. Examples of such attachment mechanisms can be seen, by way of example, in U.S. Pat. Nos. 8,925,687, 6,923,394, 6,719,241, 5,988,095, 5,957,433, 5,779,226, 5,664,766, 5,346,153, 5,312,061, 4,953,829, and U.S. Patent Publication Nos. 2017/0327355, 2016/0083231, 2014/0124719, and 2013/0334479.

Thus, to connect a rope to conventional winches, a user must have access to and be able to reach the winch hub and rope—typically the end or approximate end of the rope. In situations where a user is unable to get to or access the winch or rope, therefore, the user would not be able to connect the winch to the rope. By way of example only, these situations could include: rope hanging from cliff or tall building or other high, out-of-reach location; rope in a dangerous location or a location that one is not able to reach, such as on a frozen lake with thin ice, around a fire, or an area where hazardous chemicals are present, in hostile environments, or in a place where dangerous animals are located.

There is therefore a need for an improved winch device in which a user can connect to a rope at various points along a length thereof—even when the user is unable to manually access the flexible strand.

SUMMARY

In embodiments, a winch device comprises a spool comprising a hub rotatable about a hub axis, a first flange at a first end of the hub, a second flange at a second end of the hub, a plurality of posts comprising proximal ends and distal ends, wherein each of the posts are offset from the hub axis, and wherein the plurality of posts are movable along hub axis such that the spool is selectively configurable back and forth between an open configuration and a closed configuration, wherein when the spool is in the open configuration there is a gap between distal ends of the posts and the second flange and wherein when the spool is in the closed configuration the gap is substantially closed, a biasing member for biasing the spool towards the closed configuration, a first reset motor for effecting movement of the plurality of posts from the closed configuration to the open configuration, and a second motor for effecting axial rotation of the spool about hub axis causing the plurality of posts to rotate radially about hub axis when the spool is in the closed configuration.

In embodiments, the plurality of posts can comprise three or more posts.

In embodiments, the plurality of posts can comprise between three and eight posts.

In embodiments, the distal ends of the plurality of posts can be rounded.

In embodiments, the first and second flanges can comprise rounded internal surfaces.

In embodiments, the winch device of claim 1 can further comprise a guide for guiding a flexible strand through the gap to the hub when the spool is in the first, open configuration.

In embodiments, the guide member can comprise a "v" shape, wherein a point of the "v" shape is positioned substantially proximal the hub.

In embodiments, the posts can comprise a textured outer surface to increase surface friction such that flexible strand does not slide relative to the textured outer surface when the spool is axially rotated.

In embodiments, the first flange can comprise a plurality of post apertures, such that the plurality of posts are movable through the plurality of post apertures as the spool is selectively configurable back and forth between the open configuration and the closed configuration.

In embodiments, the first and second flanges each comprise a plurality of post apertures, such that when the plurality of posts are in the closed configuration, the plurality of posts extend through the post apertures on the first flange and distal ends of the plurality of posts operably engage with the apertures.

In embodiments, the winch device can be operably coupled to a vehicle.

In embodiments, the winch device can be coupled to a remote-controlled vehicle.

In embodiments, the winch device can further comprise a lever operably coupled to the first motor and the spool for resetting spool and selectively moving spool from a closed configuration to an open configuration.

In embodiments, a method of taking up a flexible strand using a winch device of any of the prior embodiments can include, when the spool is in the open configuration, effecting movement of the winch device such that the flexible strand moves through gap to the hub, effecting movement of the plurality of posts to closed configuration, and, with the second motor, effecting axial rotation of the spool about the hub axis causing the plurality of posts to rotate radially about the hub axis such that the flexible strand wraps around the plurality of posts.

In embodiments, in the step of effecting movement of the winch device such that the flexible strand moves through gap to the hub, a portion of flexible strand at an intermediate location thereon moves through gap to the hub.

In embodiments, in the step of effecting movement of the winch device such that the flexible strand moves through gap to the hub, a portion of flexible strand proximate an end thereof moves through gap to the hub.

In embodiments, the winch device is operably coupled to a remote controlled vehicle and wherein the step of effecting movement of the winch device comprises moving the remote controlled vehicle such that the flexible strand moves through gap to the hub.

In embodiments, the winch device is operably coupled to a remote controlled aircraft and wherein the step of effecting movement of the winch device comprises moving the remote controlled aircraft such that the flexible strand moves through gap to the hub.

In embodiments, the flexible strand comprises a rope, belt, cable, chain, cord, wire, filament, or straps.

In embodiments, a method of taking up a flexible strand using a winch device of any of the prior embodiments can include, when the spool is in the open configuration, effecting movement of the winch device a first time such that the flexible strand moves through gap to the hub, effecting movement of the plurality of posts a first time to closed configuration, with the first motor, effecting movement of the plurality of posts to open configuration, effecting movement of the winch device a second time such that the flexible strand moves through gap to the hub, effecting movement of the plurality of posts a second time to closed configuration, and, with the second motor, effect axial rotation of the spool about the hub axis causing the plurality of posts to rotate circumferentially about the hub axis such that the flexible strand wraps around the plurality of posts.

The above summary is not intended to describe each illustrated embodiment or every implementation of the present disclosure.

DESCRIPTION OF THE FIGURES

The drawings included in the present application are incorporated into, and form part of, the specification. They illustrate embodiments of the present disclosure and, along with the description serve to explain the principles of the disclosure. The drawings are only illustrative of certain embodiments and do not limit the disclosure.

FIG. 11c is a top plan view of a spool drive mechanism of winch device of FIG. 1 in a closed configuration.

Figure 1:
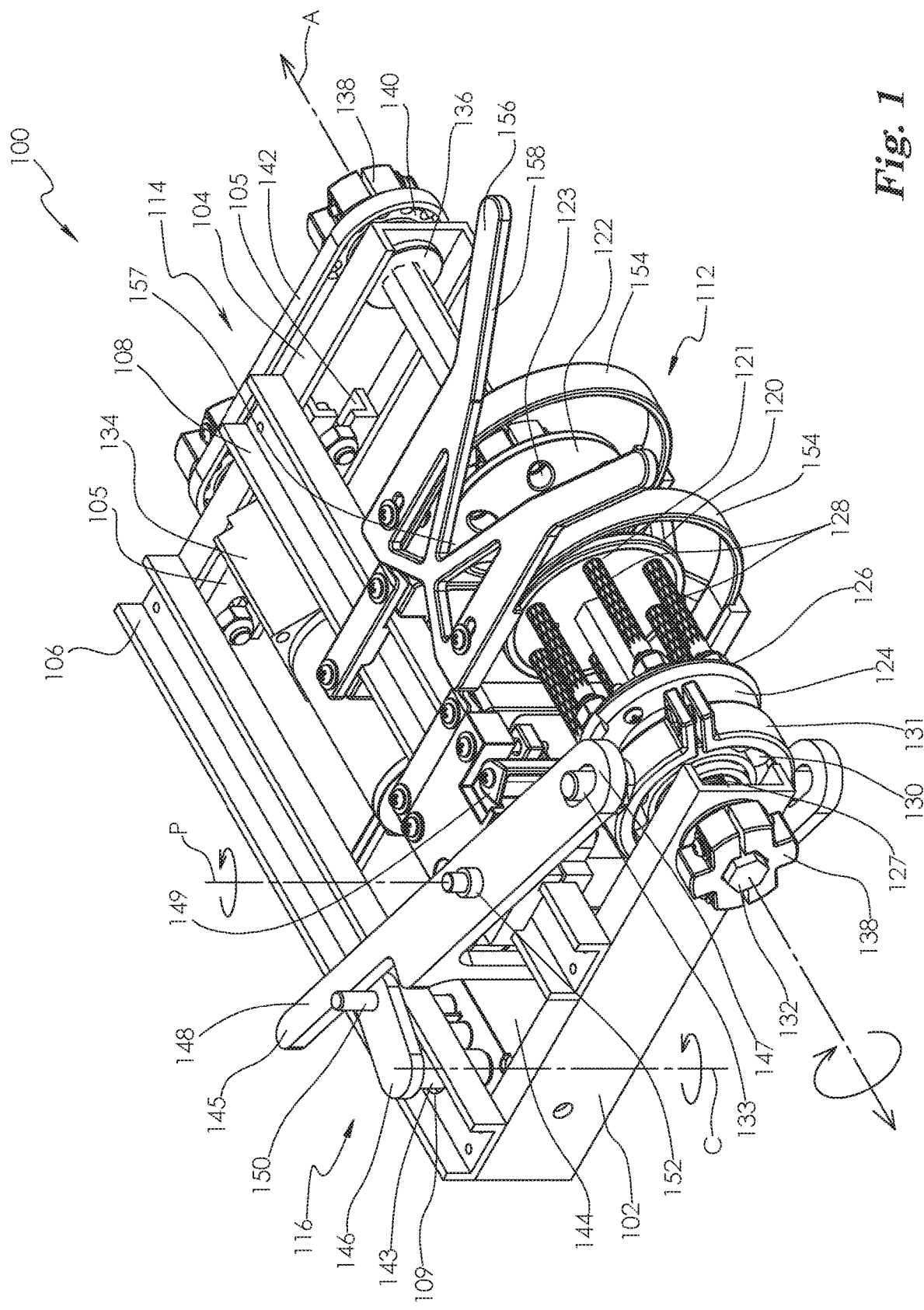
FIG. 1 is a top front perspective view of a winch device according to an embodiment of the present disclosure.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

In certain situations and locations, a winch user may not be able to access an end of a flexible strand (by way of example, a rope, belt, cable, chain, cord, wire, filament, or straps) and, therefore, is not able to connect the flexible strand to a hub of the winch. By way of example only, a winch user may not be able to access an end of a flexible strand in situations including: a rope hanging from cliff or tall building or otherwise elevated; rope in a dangerous location or a location that one is not able to reach, such as on a frozen lake with thin ice, around a fire or area where hazardous chemicals are present, in hostile environments, or in a place where dangerous animals are located. In these situations, should a user want to use a rope to either pull something towards the user from that location or to use the rope as a lead to take something into or towards the dangerous location, the user would not be able to connect a winch to the rope in the conventional way as described above in the background section, i.e., connecting an end of the rope to the winch. The winch device according to the embodiments of the present disclosure overcomes the deficiencies of prior winches and methods and eliminates an operator's need to have manual access to the end of a flexible strand.

Figure 2:
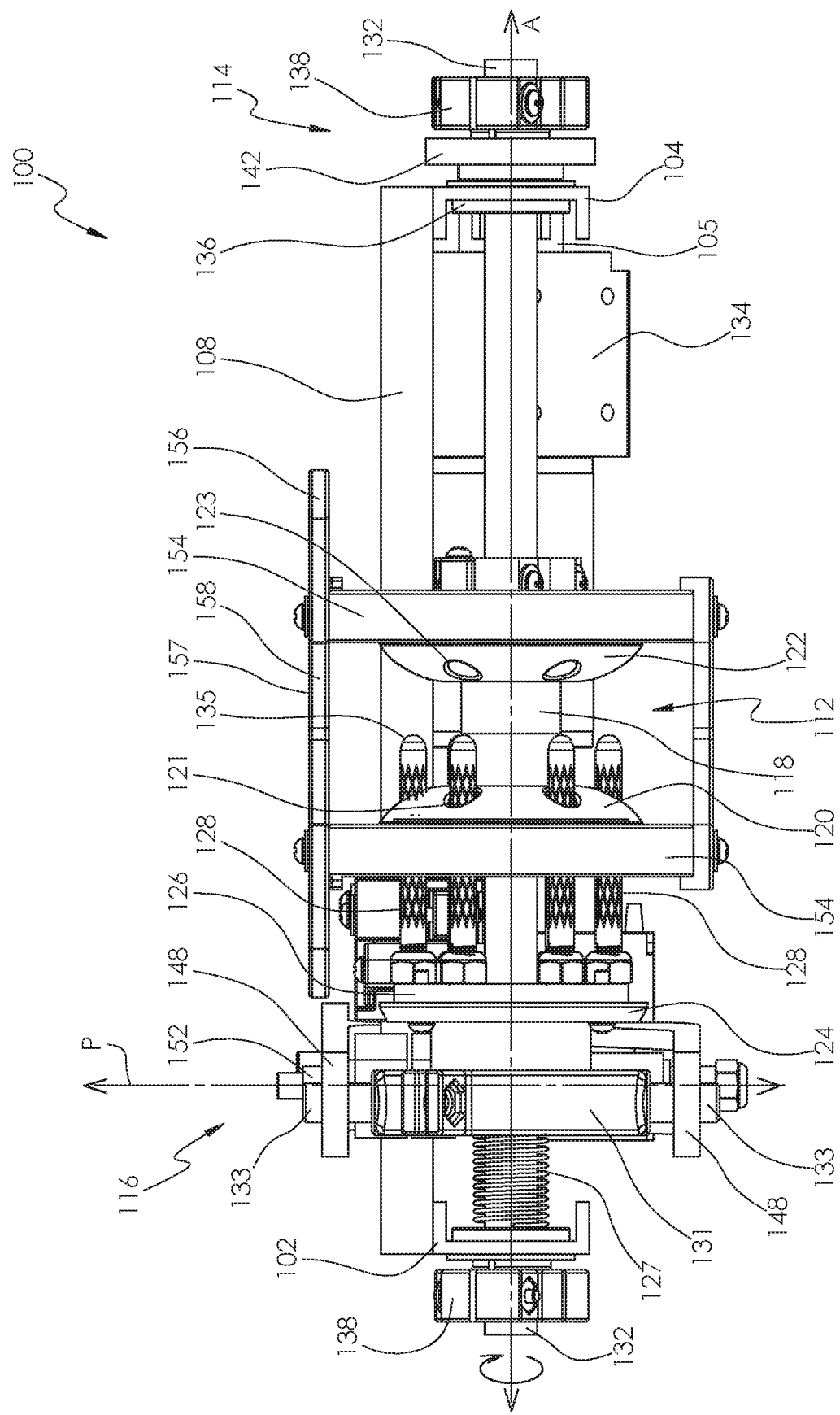
FIG. 2 is a front elevational view of the winch device of FIG. 1.
Figure 3:
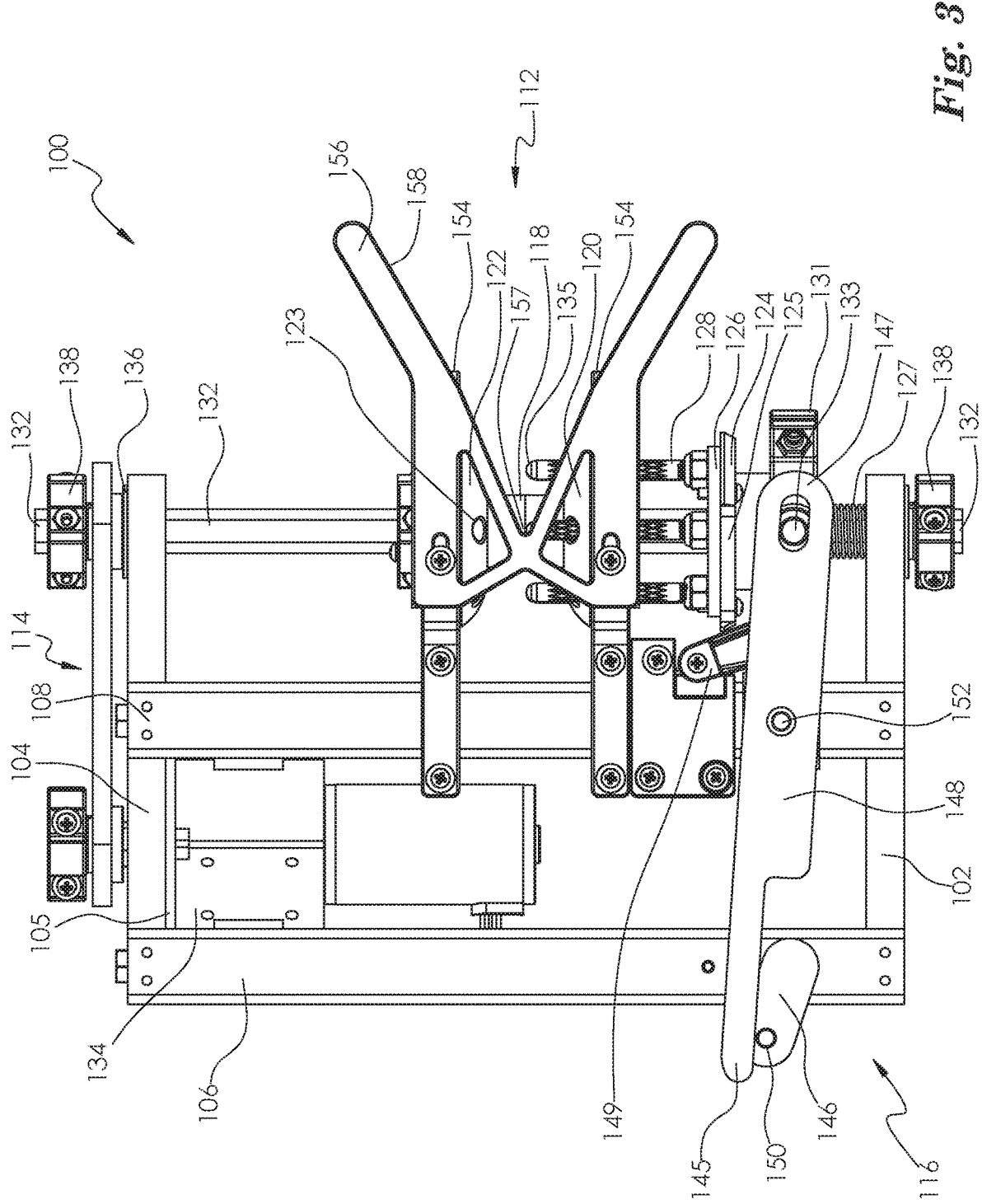
FIG. 3 is a top plan view of the winch device of FIG. 1.

Referring to FIGS. 1-3, a winch device 100 according to embodiments of the present disclosure includes first and second side bars 102, 104 and one or more cross bars—as depicted, first and second cross bars 106, 108. First and second side bars 102, 104 can include shaft apertures (not depicted in the figures) therein for ends of a spool shaft, described below, to extend through first and second side bars 102, 104. Additional apertures can be included in first and second side bars 102, 104 and first and second cross bars 106, 108 for mounting various mechanical and electromechanical components thereto and/or for mounting winch device 100 to another structure, such as, by way of example, a vehicle, aircraft, or watercraft. Second side bar 104 can include a motor mount channel 105 for mounting a motor, such as an electric spool drive motor 134, thereto, as will be described further below. Winch device 100 further includes a spool 112, spool drive mechanism 114, spool reset mechanism 116, and a guide 156 that can be mounted to winch device 100, such as, by way of example, with a plurality of guide hoops 154. In addition to mounting structures, guide hoops 154 can also act as guards to protect spool 114 when mounted on winch device 100.

Referring to FIGS. 1-3, spool 112 includes a hub 118 rotatable about an axis "A" that can be formed of one or more parts (as depicted, hub is formed of first and second portions). Spool 112 can further include a first flange 120, a second flange 122, and a plurality of posts or pins 128 that can be operably mounted on a hub plate 126 connected to a holder plate 124. As will be described further below, plurality of posts 128 are movable back and forth between an open configuration and a closed configuration, wherein when the spool is in the open configuration there is a gap between distal ends of the posts (distal relative to hub plate 126) and the second flange 122 and wherein when the spool 112 is in the closed configuration the gap is substantially closed. As depicted, plurality of posts 128 includes six posts, but, in other embodiments, other numbers of posts can be included, such as, by way of example, two, three, four, five, six, seven, eight, or more. In embodiments, plurality of posts 128 include a textured or coated outer surface to increase surface roughness or coefficient of friction of the surface. Such surface texture can include threads, knurling, or other surface texture. Such coatings can include rubber or other polymers with a high coefficients of friction. In embodiments, plurality of posts 128 include a rounded end 135, such that when spool mechanism is closed, rounded end 135 slides past the flexible strand rather than pinning it against second flange 122 (later depicted in FIG. 11b).

Spool 112 further includes a bearing bar 131 and hub bearings 130 for axial rotation of hub 126 about axis "A," as well as bearing bar posts 133 extending from bearing bar 131 operable with spool reset mechanism 116, which is described further below. Spool 112 additionally includes a biasing member 127, such as a compression spring, for biasing spool 112 towards a closed configuration.

Figure 5:
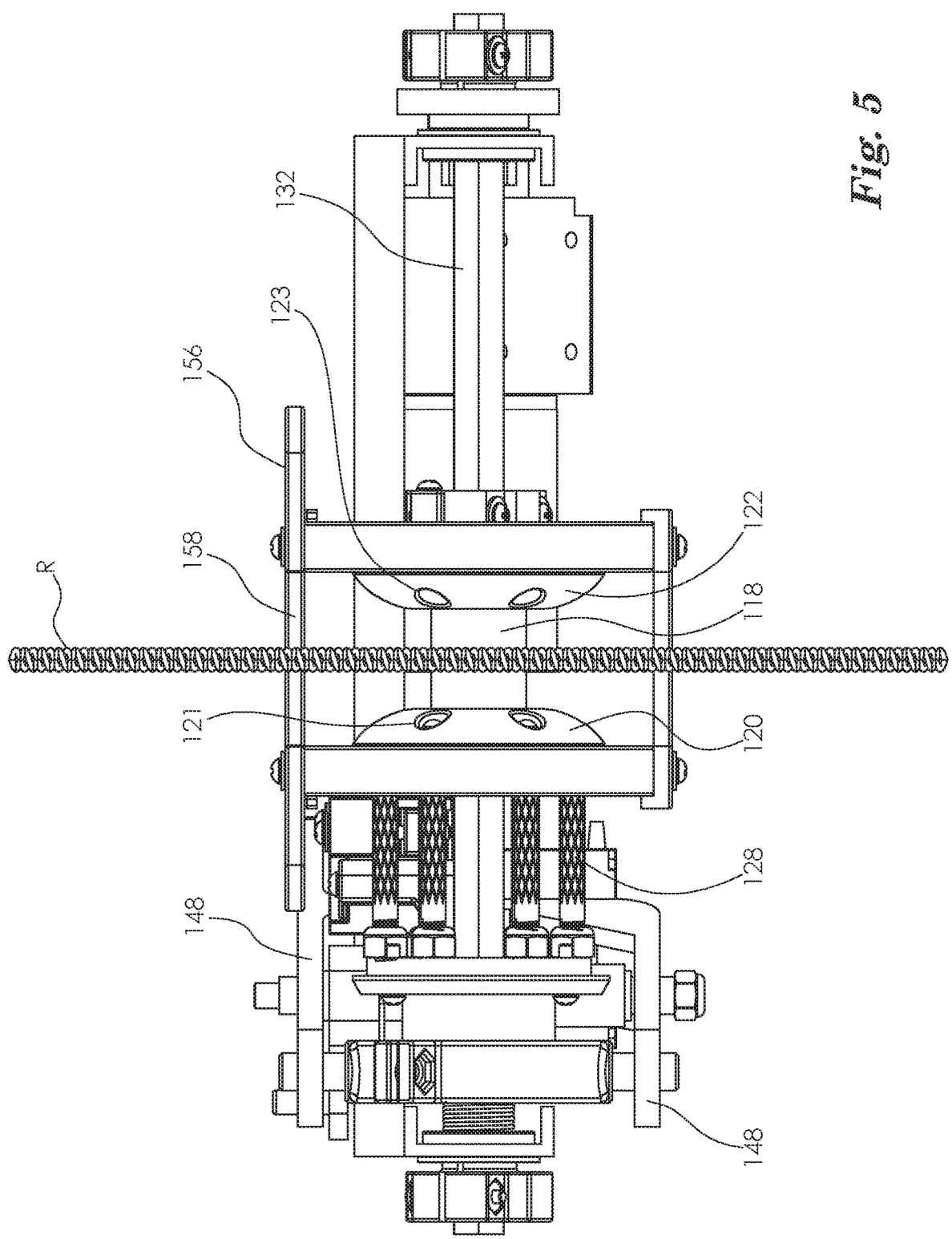
FIG. 5 is a front elevational view of the winch device of FIG. 1, depicting a flexible strand "R" positioned in a guide of winch device.

Referring to FIG. 2, first flange 120 can include a plurality of apertures 121 through which posts 128 can extend in part or in whole (including when plurality of posts 128 are moved back and forth between an open configuration and a closed configuration) and second flange 122 can include a plurality of apertures or recesses 123 through which posts 128 can extend in part or in whole when plurality of posts 128 are moved to a closed configuration. As can be seen in FIG. 5, an interior-facing surface of each of the first flange 120 and second flange 122, i.e., surfaces facing one another, can be convex or curved, such that when a flexible strand is wound up on hub 118, the surfaces can help or guide the flexible strand down the surfaces to hub—and not bind up on hub itself.

Referring to FIGS. 1-3, spool drive mechanism 114 includes a shaft 132 that can be driven by spool drive motor 134 mounted to mount channel 105 on second side bar 104. Motor 134 can comprise a gear head (not depicted). As depicted, shaft 132 comprises a hexagonal cross section, but, in embodiments, shaft can comprise other cross sectional shapes, such as triangular, square or rectangular, pentagonal, fluted, splined, or the like. Shaft 132 is rotatable about axis "A," which is coaxial with axis about which hub 118 axially rotates. Spool drive mechanism 114 includes shaft bearings 136 for axial rotation of shaft about axis "A." One or more shaft collars 138 can be included for retention of shaft 132 on first and second side bars 102, 104 and to inhibit movement of shaft along axis "A" as spool 112 is opened and closed. Spool drive mechanism 114 can further include a sprocket 140 and chain or belt 142 operably coupled with shaft drive motor 134 and engageable with shaft 132 for driving axial rotation about axis "A."

Referring to FIGS. 1-3, spool reset mechanism 116, which can be mounted on first cross bar 106, includes a reset mechanism motor 144, a crank 146 having a crank post 143 extending therefrom operably and pivotally coupled to reset mechanism motor 144 and extending through an aperture 109 in first crossbar 106, a stud 150 or other projection extending upwardly from crank 146 for operable and slidable engagement with a first end 145 of a lever or yoke 148 pivotably mounted to second crossbar 108 with a pivot mount 152 and in operable engagement with crank 146—and in operable engagement with bearing bar posts 133 extending from bearing bar 131, proximate a second end 147 of lever 148. Lever 148 can include a cutout portion along a length thereof providing clearance and further enabling slidable engagement of stud 150 with first end 145 of level 148, described further below. Spool reset mechanism 116 can be used to reset spool 112 from a closed configuration to an open configuration—or, in embodiments, maintain spool 112 in open configuration, by offsetting the bias of the biasing member 127.

Referring to FIGS. 1-3, and as described above, winch device 100 includes guide 156 that can be mounted to winch device 100, such as, by way of example, with guide hoops 154 that can be mounted to second cross bar 108. As depicted, in embodiments, guide 156 can be "v" shaped and have an interior surface 158 and be coupled to winch device 100 such that the point of the "v" 157 is positioned substantially over hub 118 (see FIGS. 1, 2, 3, 4, 6, 8 and 9). In embodiments, guide 156 and guide hoops 154 can be constructed of a material with high strength and toughness—yet a low coefficient of friction, such as, by way of example, polytetrafluoroethylene. Such material enables a flexible strand to easily move along interior surfaces 158 and also provides high durability should winch device impact any structures when being moved to flexible strand. In other embodiments, interior surfaces 158 can be coated of a material comprising a low coefficient of friction, such as, by way of example, polytetrafluoroethylene, and guide 156 can be constructed of a different material.

Figure 12:
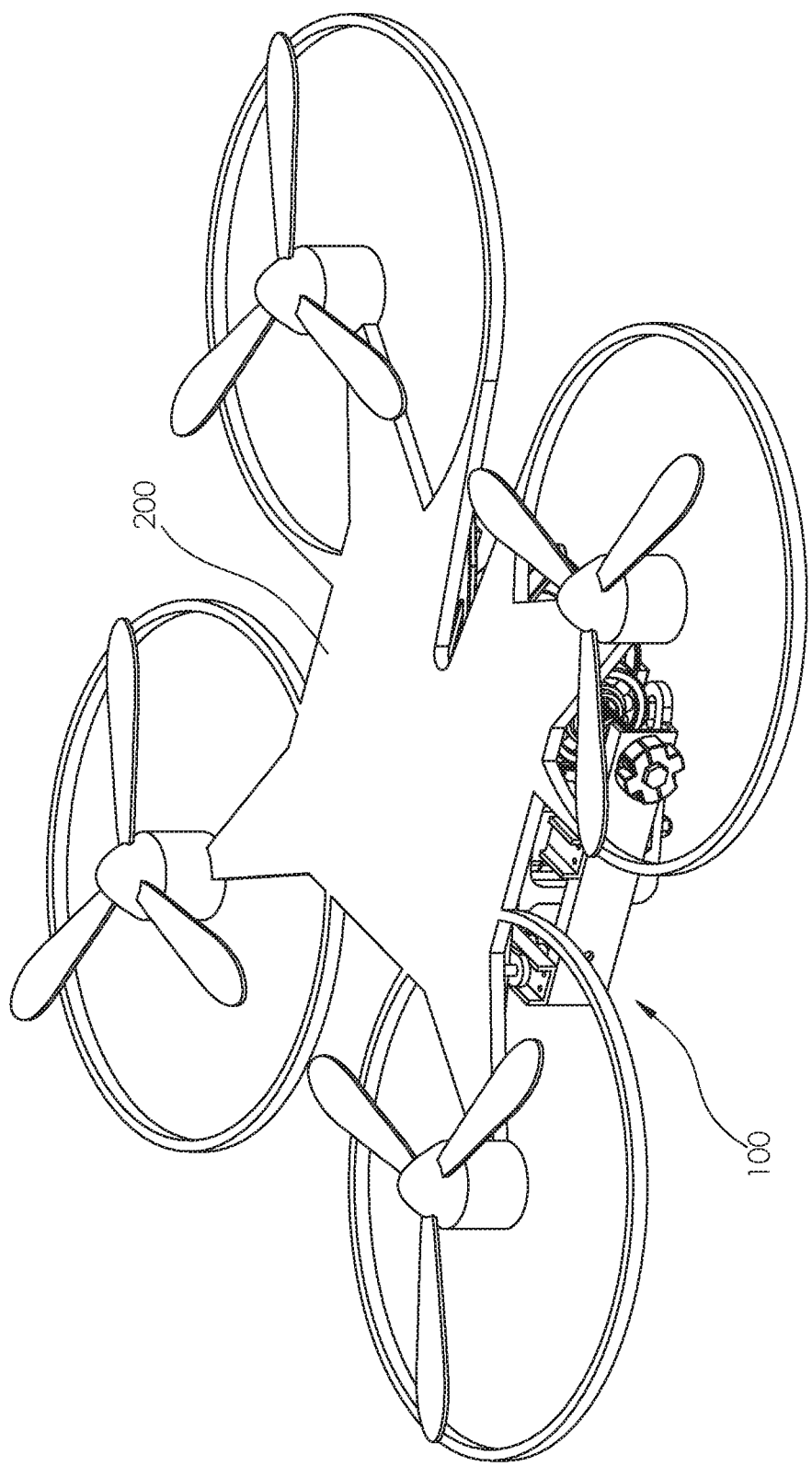
FIG. 12 is a top front perspective view of a winch device according to an embodiment of the present disclosure coupled to a remote control aircraft.

In embodiments, winch device 100 can be mounted on or coupled to a number of different devices, including remotely controlled vehicles, such as, by way of example, helicopters or other aircraft, boats, submarine, or other watercraft, cars or other vehicles, drones, and robots. By way of example, as depicted schematically in FIG. 12, winch device 100 can be mounted on a remote-controlled aircraft 200. In other embodiments, winch device 100 can be mounted on or coupled to actual helicopters or other aircraft, boats, submarine, or other watercraft, cars or other vehicles. While FIG. 12 depicts winch device 100 can be mounted on a remote-controlled aircraft 200, in other embodiments, remote-controlled aircraft 200 can be any of, by way of example, helicopters or other aircraft, boats, submarine, or other watercraft, cars or other vehicles, drones, and robots, whether remote-controlled or not.

In embodiments, winch device 100 is not mounted to a device, vehicle, or remote control vehicle, but rather is carried directly by a user or operably coupled to a user, such as, by way of example, on a user's back or chest. This enables a user that otherwise might not be able to use both hands to attach a flexible strand to a winch assembly to do so. In such embodiments, controls for winch device 100 can be included directly on winch device 100 and not on a remote controller.

Figure 4:
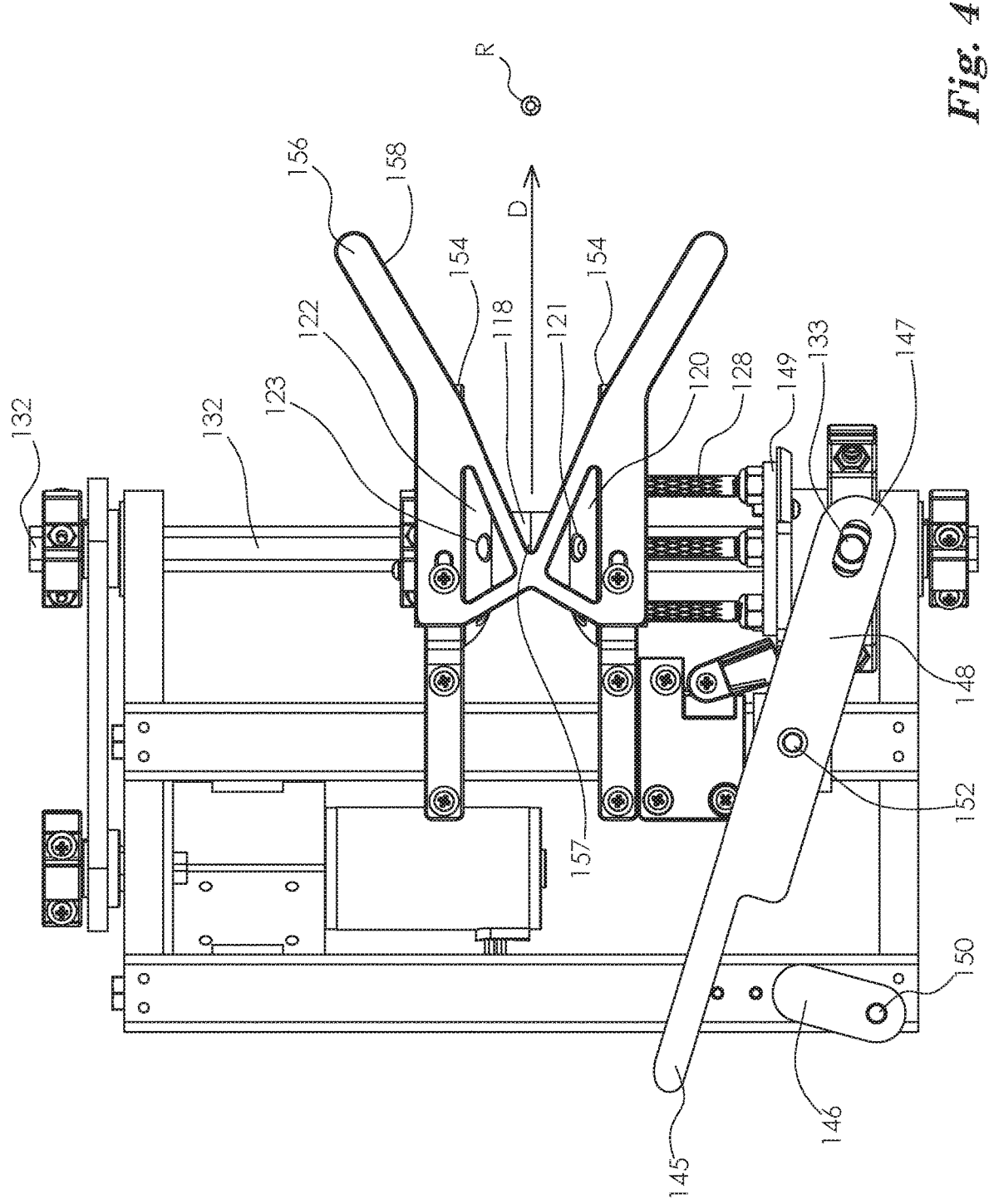
FIG. 4 is a top plan view of the winch device of FIG. 1, depicting a direction of travel "D" and a flexible strand "R."
Figure 6:
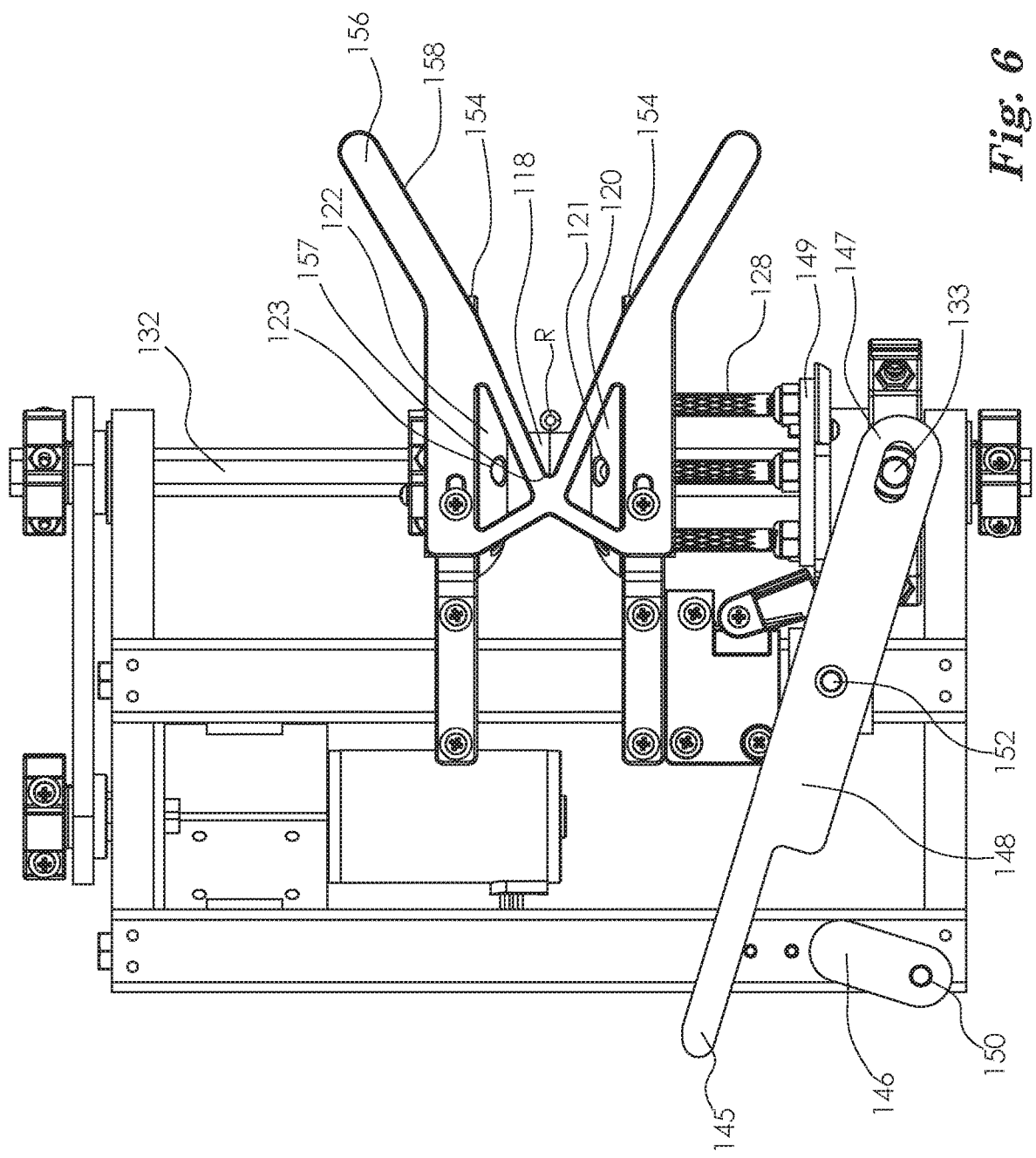
FIG. 6 is a top plan view of the winch device of FIG. 1, depicting a flexible strand "R" positioned in a guide of winch device.
Figure 7:
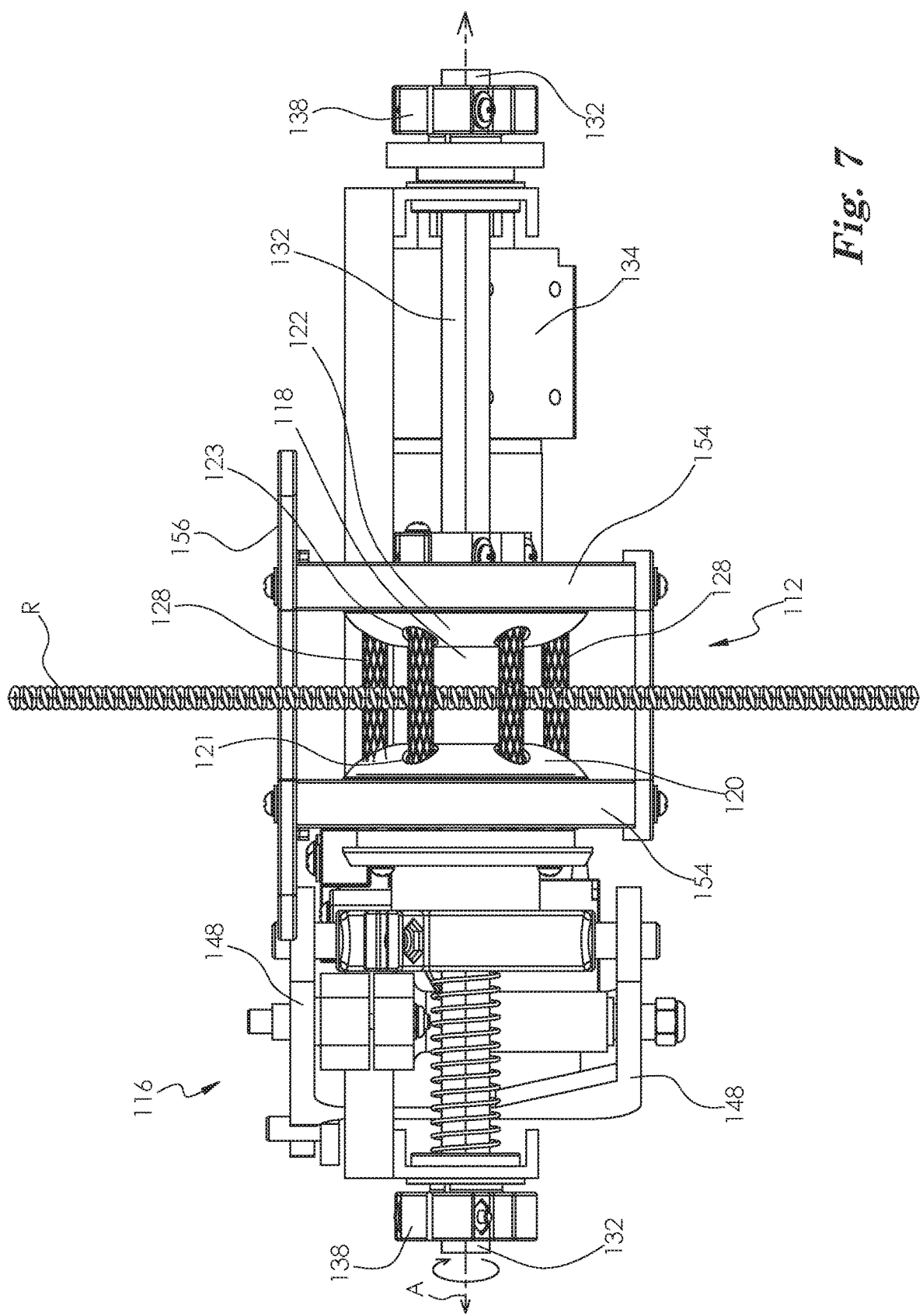
FIG. 7 is a front elevational view of the winch device of FIG. 1, depicting a flexible strand "R" positioned in a spool of winch device after the spool has been moved from an open configuration to a closed configuration.
Figure 10A:
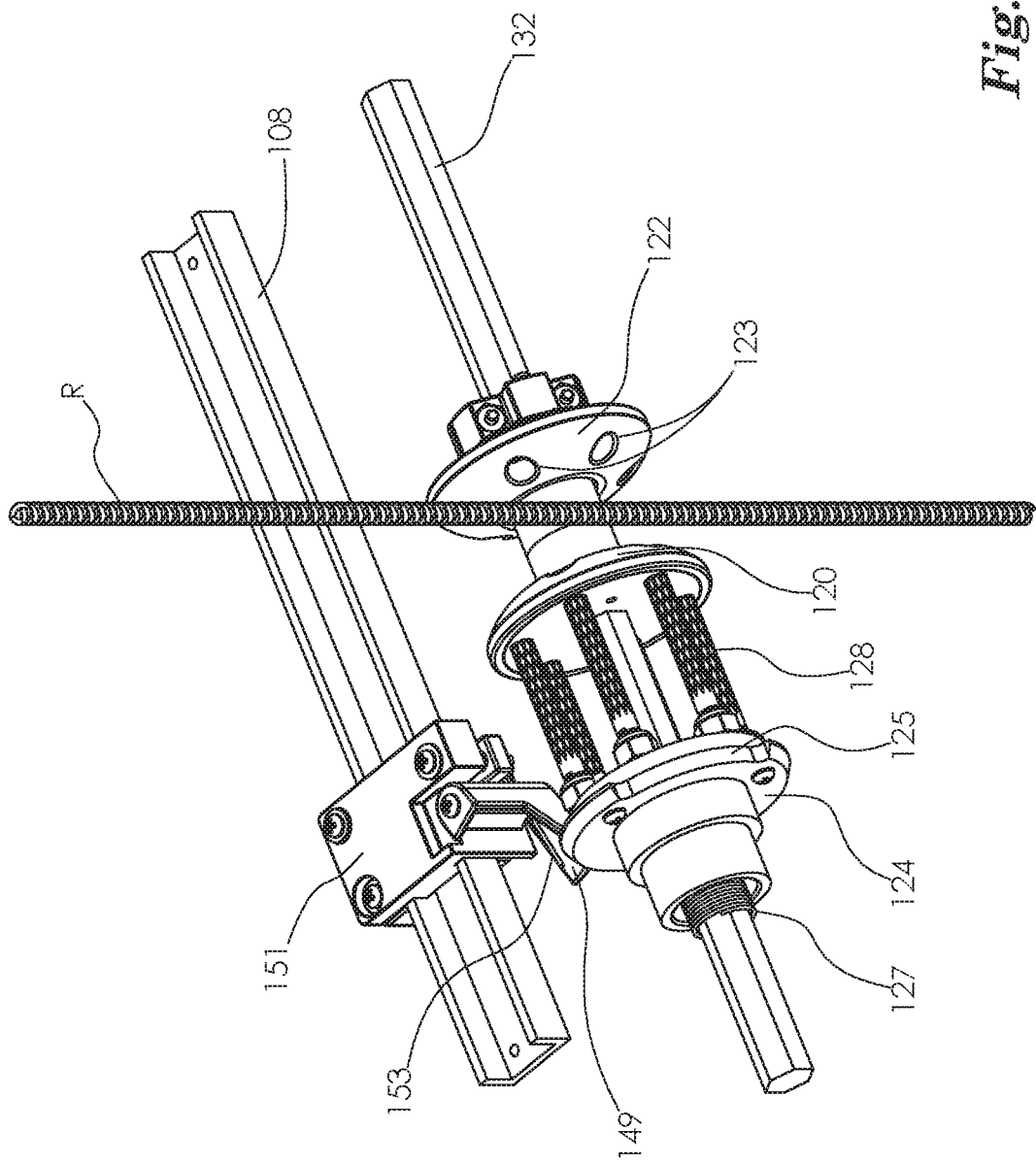
FIG. 10a is a top front perspective view of a spool drive mechanism of winch device of FIG. 1 in an open configuration.
Figure 10B:
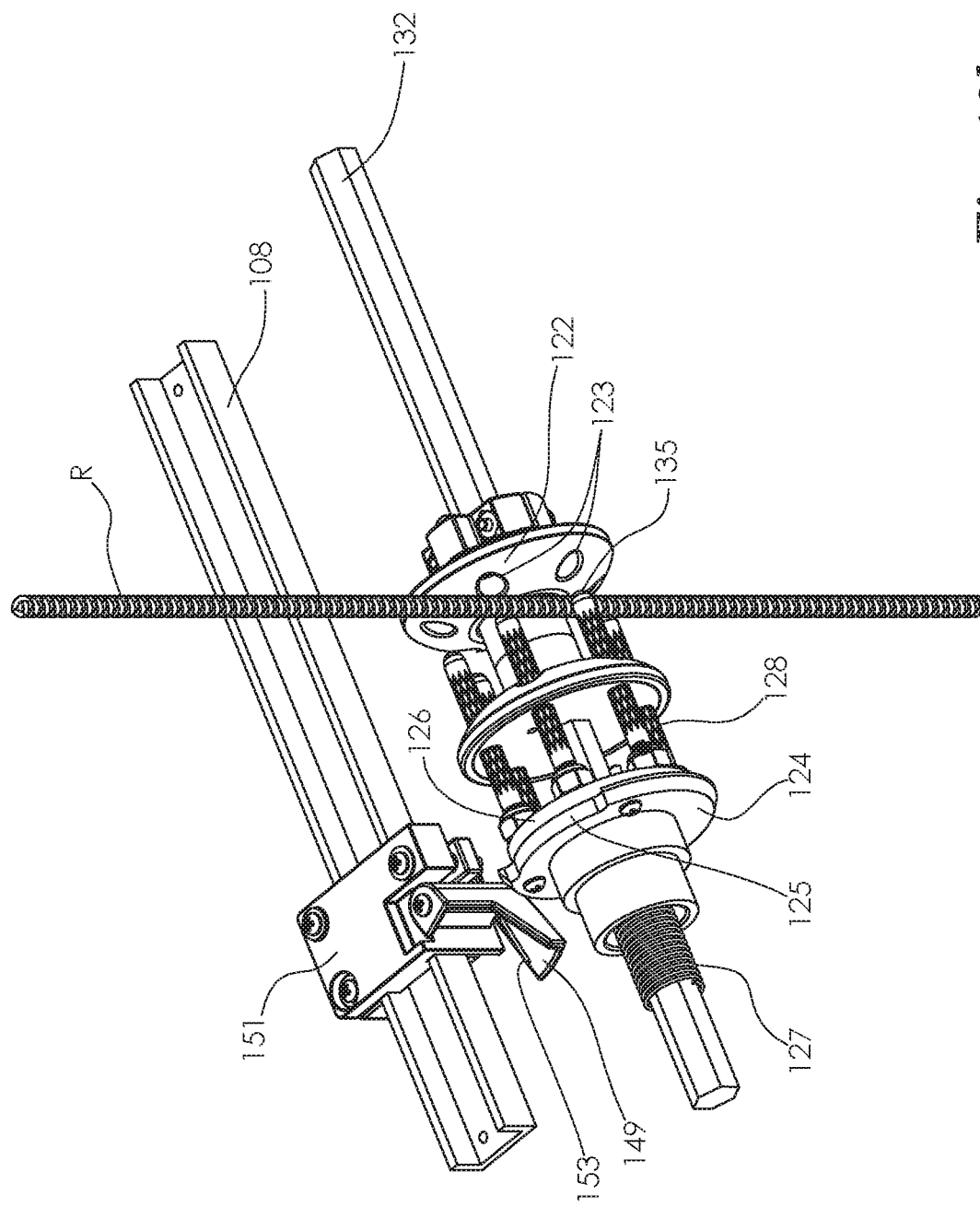
FIG. 10b is a top front perspective view of a spool drive mechanism of winch device of FIG. 1 in a partially closed configuration.
Figure 10C:
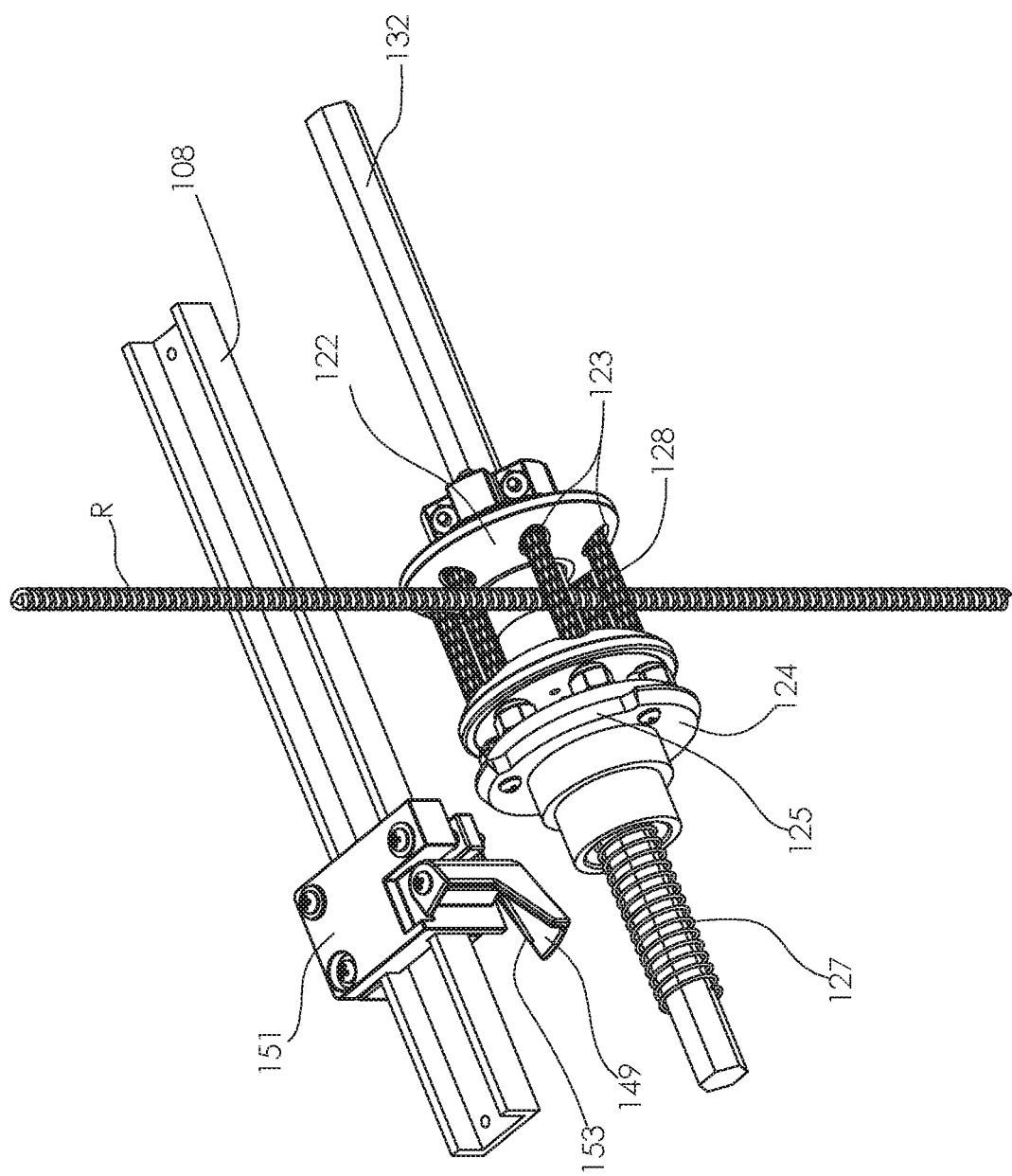
FIG. 10c is a top front perspective view of a spool drive mechanism of winch device of FIG. 1 in a closed configuration.
Figure 11A:
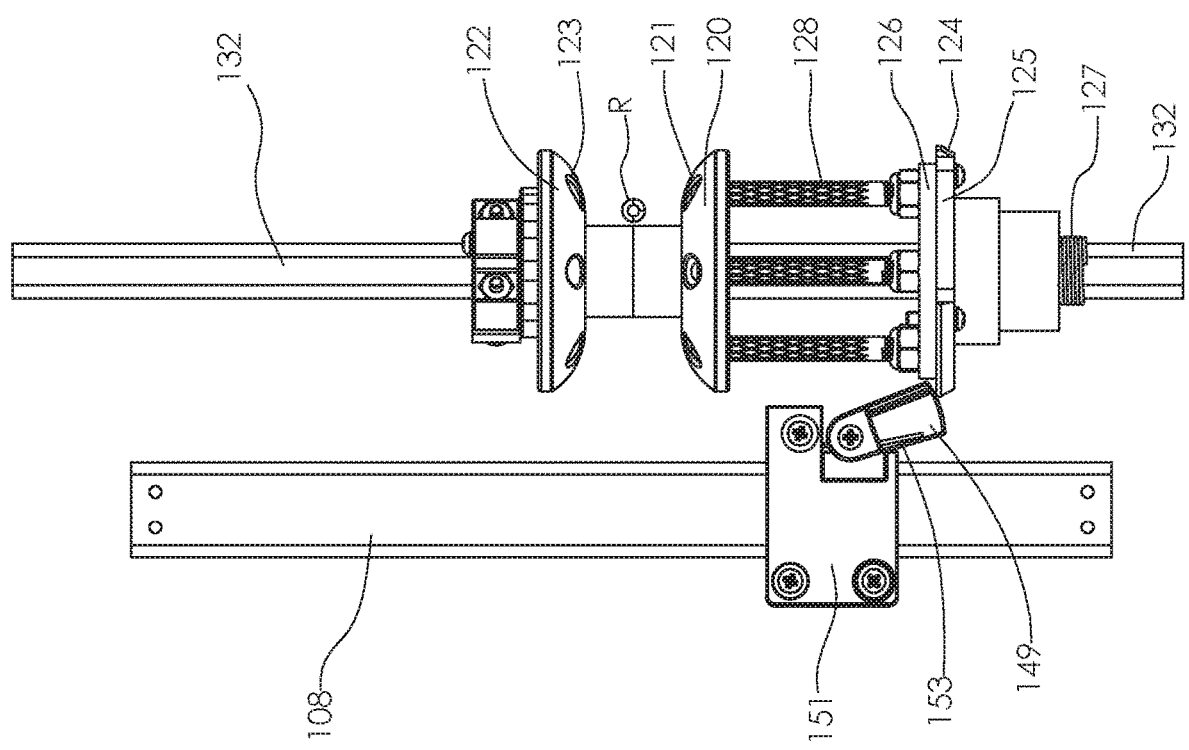
FIG. 11a is a top plan view of a spool drive mechanism of winch device of FIG. 1 in an open configuration.
Figure 11B:
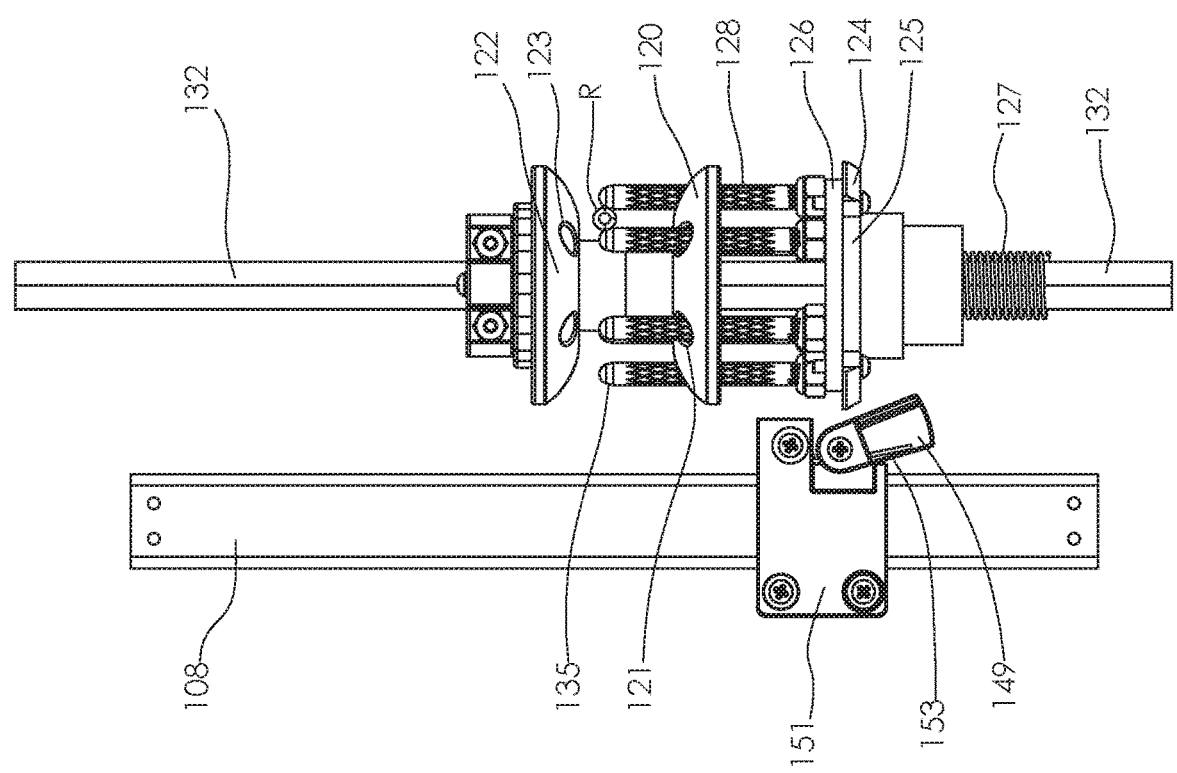
FIG. 11b is a top plan view of a spool drive mechanism of winch device of FIG. 1 in a partially closed configuration.

Referring to FIG. 4, to use winch device 100, winch device 100 is moved towards and to a flexible strand "R" (such as a rope, for example), such as along direction of travel "D," such that rope R is positioned in between interior surfaces 158 of guide 156. Referring to FIGS. 5 and 6, winch device 100 is continued to be moved until flexible strand R is either at the "v" in guide and/or in contact with or near hub 118. Referring to FIG. 7, once in this position, plurality of posts 128 are moved to their closed configuration such that at least a portion of flexible strand R is intermediate hub 118 and one or more of plurality of posts 128. Referring to FIGS. 10a-c and 11a-c, to move plurality of posts 128 to their closed configuration, shaft 132 is rotated such that holder plate 124 rotates as well. A holding pawl 149 is coupled to second cross bar 108 by a mount 151 prevents plurality of posts 128 from moving to their closed configuration, which they are inclined to do based on bias of biasing member 127. Holding pawl 149 can include a torque spring 153 that can bias holding pawl 149 to a first position, such as depicted in FIG. 11a. As holder plate 124 continues to rotate, eventually holding pawl 149 rotates to a position where it is lined up with clearance notch 125, as depicted in FIGS. 10b and 11b. When this happens, holder plate 124 no longer prevents plurality of posts 128 from moving to their closed configuration, such that braising member 127 causes plurality of posts 128 to move to their closed configuration, as depicted in FIGS. 10c and 11c, thus at least a portion of flexible strand R is intermediate hub 118 and one or more of plurality of posts 128.

In certain circumstances, when plurality of posts 128 are moved to their closed configuration, at least a portion of flexible strand R is captured between hub 118 and one or more of plurality of posts 128. In certain circumstances, when plurality of posts 128 are moved to their closed configuration, at least a portion of flexible strand R is pinned or otherwise pressed against second flange 122 by one or more of plurality of posts 128. Then, in each of these circumstances, axial rotation of the spool 112 about axis A is effected, such as with spool drive motor 134, causing plurality of posts 128 to rotate radially about axis A. Due to the flexible strand R being located intermediate or captured between hub 118 and one or more of plurality of posts 128—and/or pinned or otherwise pressed against second flange 122 by one or more of plurality of posts 128—in combination with the friction between flexible strand R and the one or more of plurality of posts 128 when spool 112 is axially rotated, flexible strand R wraps around the plurality of posts 128 between first and second flanges 120, 122 of spool 112. This enables a user to either bring in what is along the length of flexible strand R (or at an end of flexible strand R) or otherwise to use flexible strand R to move or "walk" winch device 100 or whatever is connected to winch device 100 toward a point along flexible strand R (or to an end of flexible strand R).

In embodiments, first and second flanges 120, 122 can comprise an angled or rounded shape (as depicted, first and second flanges 120, 122 have a rounded shape) such that flexible strand R is wrapped around plurality of posts 128 without riding up and over first and second flanges 120, 122. When spool drive motor 134 causes shaft 132, spool 112, and plurality of posts 128 to rotate radially, in embodiments, spool 112 can move back and forth, axially, along axis A by a distance that is about the length of plurality of posts 128 between first and second flanges 120, 122 such that flexible strand R is distributed substantially evenly on plurality of posts 128 between first and second flanges 120, 122.

In some situations, despite a user attempting to position winch device 100 such that the flexible strand R is located intermediate or captured between hub 118 and one or more of plurality of posts 128—and/or pinned or otherwise pressed against second flange 122 by one or more of plurality of posts 128—that positioning may not occur. And, in some situations, this may not be realized until after plurality of posts 128 are moved to their closed configuration. Rather than having to return a winch device 100 to an operator to manually reset, spool reset mechanism 116 can be used to remotely reset spool 112 to its open configuration to enable a user to reposition winch device 100 to a desired position such that flexible strand R is located intermediate or captured between hub 118 and one or more of plurality of posts 128—and/or pinned or otherwise pressed against second flange 122 by one or more of plurality of posts 128. This can be repeated until an operator has achieved a desired positioning of winch device 100 relative to flexible strand R.

Figure 8:
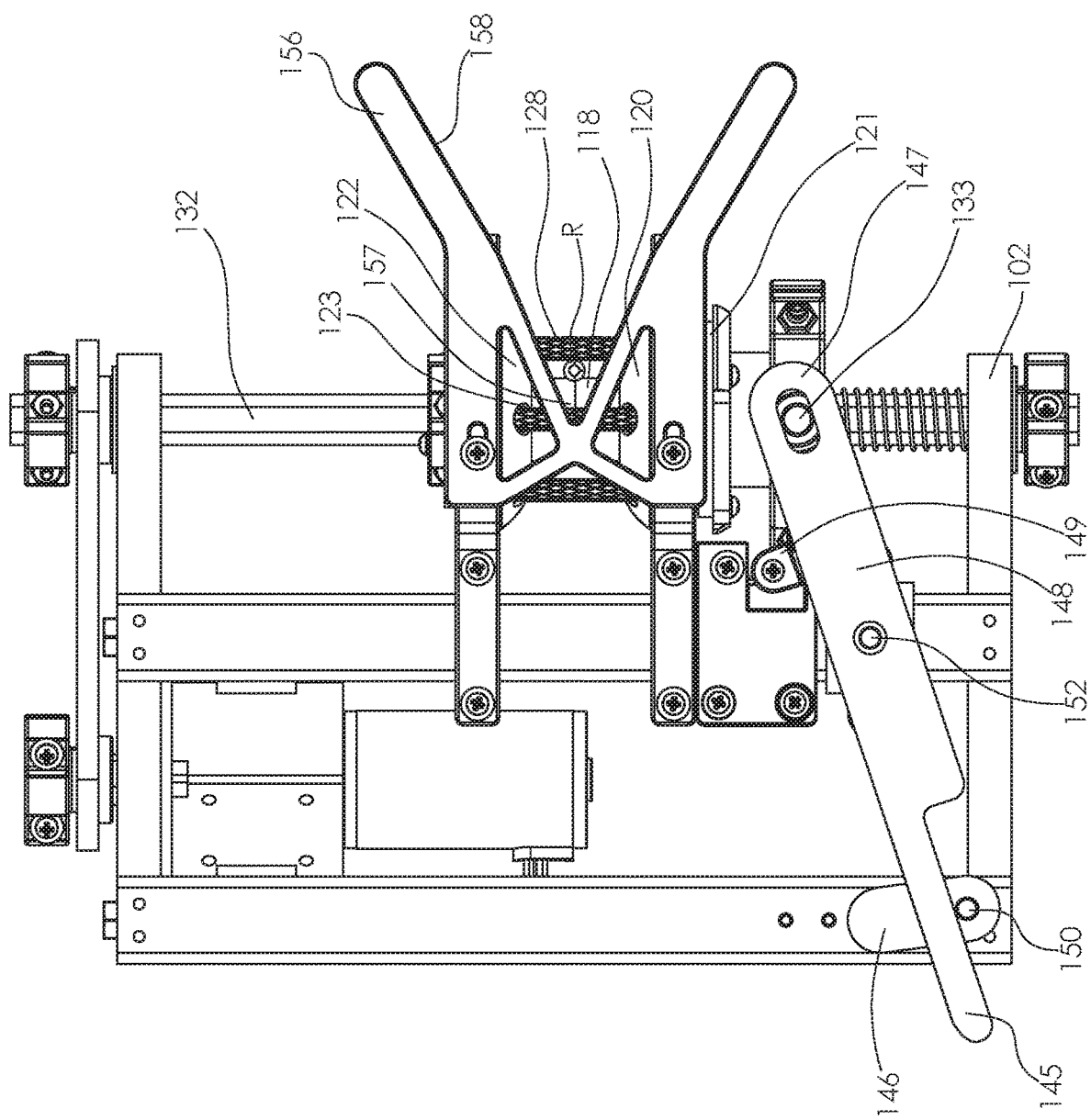
FIG. 8 is a top plan view of the winch device of FIG. 1, depicting a flexible strand "R" positioned in a spool of winch device after the spool has been moved from an open configuration to a closed configuration.
Figure 9:
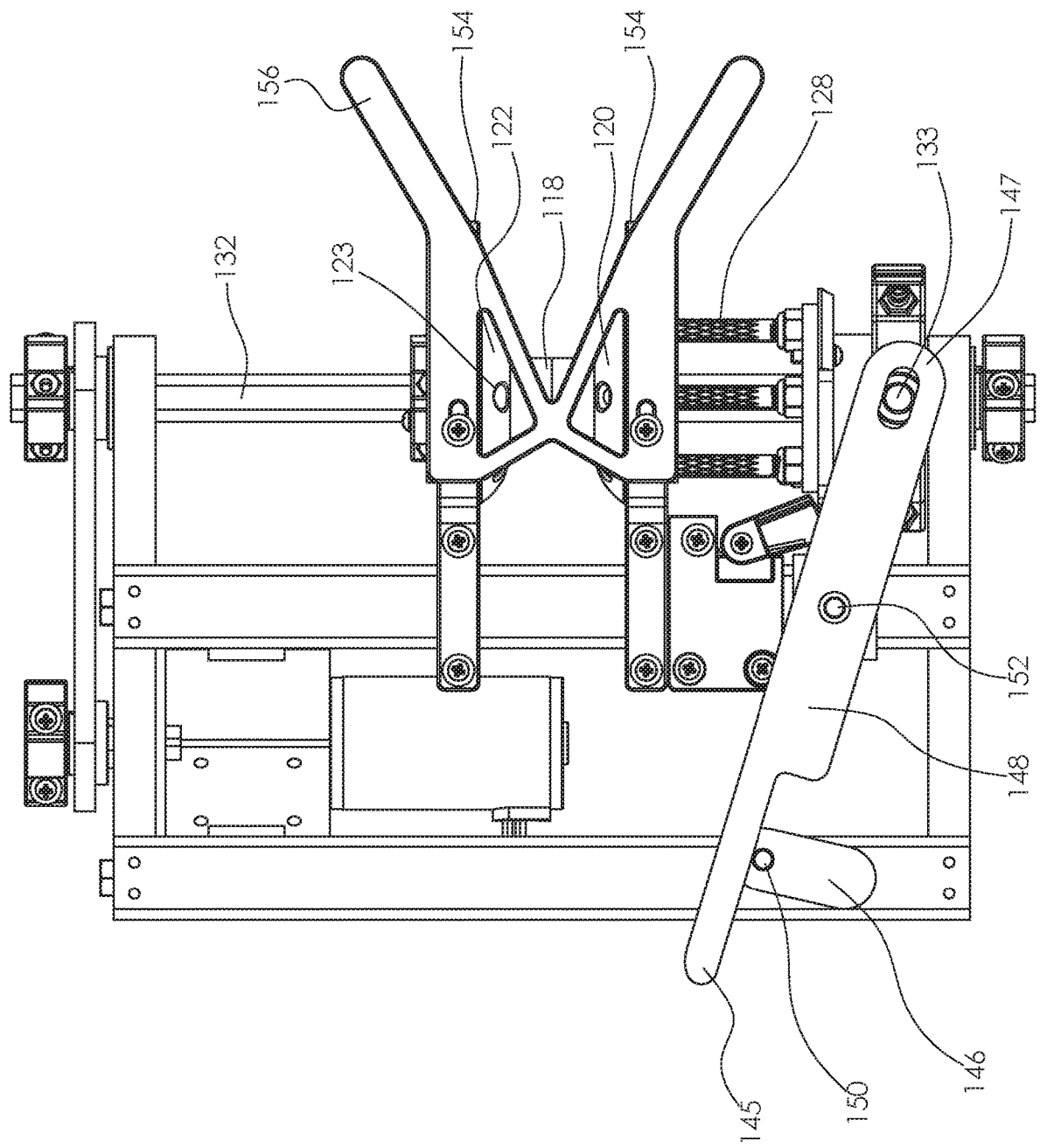
FIG. 9 is a top plan view of the winch device of FIG. 1 depicting a reset mechanism moving the spool from a closed configuration to an open configuration.

Referring to FIGS. 7 and 8, to operate reset mechanism 116, when spool 112 is in closed configuration, second end 147 of lever is in a distal position relative to first side bar 102 (away from first side bar 102, towards second side bar 104). Reset motor 144 (see FIG. 1) causes crank 146 to rotate about crank post axis "C" in a counter clockwise direction (although, in embodiments, it could be in a clockwise direction) such that stud 150 (see FIGS. 8-9) slidably engages second end 145 of lever 148 and causes lever 148 to pivot about pivot mount axis "P" (see FIG. 2) and second end 147 of lever moves directionally towards a proximal position relative to first side bar 102 (towards first side bar 102, away from second side bar 104). As this happens, spool 112 and plurality of posts 128 are moved from closed configuration (FIGS. 7 and 9) towards open configuration (FIG. 9). FIGS. 1 and 2 depict spool 112 and plurality of posts 128 in a position in between open and closed. Reset motor continues to cause crank to rotate about crank post axis C in a counter clockwise direction until holding pawl 149 engages holder plate 124 and retains spool 112 and plurality of posts 128 in its reset or ready to operate position (FIGS. 5 and 6). Once winch device 100 is in this reset configuration, a user can then again make an attempt to reposition winch device 100 to a desired position such that flexible strand R is located intermediate or captured between hub 118 and one or more of plurality of posts 128—and/or pinned or otherwise pressed against second flange 122 by one or more of plurality of posts 128.

All of the features disclosed in this specification (including the references incorporated by reference, including any accompanying claims, abstract and drawings), and/or all of the steps of any method or process so disclosed, may be combined in any combination, except combinations where at least some of such features and/or steps are mutually exclusive.

Each feature disclosed in this specification (including references incorporated by reference, any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. Additionally, the term "flexible strand" as used herein can include a number of different types of flexible members or strands, including, by way of example, rope, belt, cable, chain, cord, wire, filament, or straps. Similarly, when an example of one or more types of strands is used, e.g., rope or cable, it should be understood that such reference is not limiting, unless explicitly so, and one or more of the other type or types of flexible strands can similarly be used in the described devices or methods.

The invention is not restricted to the details of the foregoing embodiment(s). The invention extends to any novel one, or any novel combination, of the features disclosed in this specification (including any incorporated by reference references, any accompanying claims, abstract and drawings), or to any novel one, or any novel combination, of the steps of any method or process so disclosed The above references in all sections of this application are herein incorporated by references in their entirety for all purposes.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

What is claimed is:

1. A winch device comprising:
   a spool comprising:
   a hub rotatable about a hub axis;
   a first flange at a first end of the hub;
   a second flange at a second end of the hub;
   a plurality of posts comprising proximal ends and distal ends, wherein each of the posts are offset from the hub axis, and
   wherein the plurality of posts are movable along hub axis such that the spool is selectively configurable back and forth between an open configuration and a closed configuration, wherein when the spool is in the open configuration there is a gap between distal ends of the posts and the second flange and wherein when the spool is in the closed configuration the gap is substantially closed;
   a biasing member for biasing the spool towards the closed configuration;
   a first reset motor for effecting movement of the plurality of posts from the closed configuration to the open configuration; and
   a second motor for effecting axial rotation of the spool about hub axis causing the plurality of posts to rotate radially about hub axis when the spool is in the closed configuration.

2. The winch device of claim 1, wherein the plurality of posts comprises three or more posts.

3. The winch device of claim 1, wherein the plurality of posts comprises between three and eight posts.

4. The winch device of claim 1, wherein the distal ends of the plurality of posts are rounded.

5. The winch device of claim 1, wherein the first and second flanges comprise rounded internal surfaces.

6. The winch device of claim 1, further comprising a guide for guiding a flexible strand through the gap to the hub when the spool is in the first, open configuration.

7. The winch device of claim 1, wherein the guide member comprises a "v" shape, wherein a point of the "v" shape is positioned substantially proximal the hub.

8. The winch device of claim 1, wherein the posts comprise a textured outer surface to increase surface friction such that flexible strand does not slide relative to the textured outer surface when the spool is axially rotated.

9. The winch device of claim 1, wherein the first flange comprises a plurality of post apertures, such that the plurality of posts are movable through the plurality of post apertures as the spool is selectively configurable back and forth between the open configuration and the closed configuration.

10. The winch device of claim 1, wherein the first and second flanges each comprise a plurality of post apertures, such that when the plurality of posts are in the closed configuration, the plurality of posts extend through the post apertures on the first flange and distal ends of the plurality of posts operably engage with the apertures.

11. The winch device of claim 1 operably coupled to a vehicle.

12. The winch device of claim 1 operably coupled to a remote-controlled vehicle.

13. The winch device of claim 1, further comprising a lever operably coupled to the first motor and the spool for resetting spool and selectively moving spool from a closed configuration to an open configuration.

14. A method of taking up a flexible strand using a winch device of claim 1, the method comprising:
   when the spool is in the open configuration, effecting movement of the winch device such that the flexible strand moves through gap to the hub;
   effecting movement of the plurality of posts to closed configuration; and
   with the second motor, effecting axial rotation of the spool about the hub axis causing the plurality of posts to rotate radially about the hub axis such that the flexible strand wraps around the plurality of posts.

15. The method of claim 14, wherein in the step of effecting movement of the winch device such that the flexible strand moves through gap to the hub, a portion of flexible strand at an intermediate location thereon moves through gap to the hub.

16. The method of claim 14, wherein in the step of effecting movement of the winch device such that the flexible strand moves through gap to the hub, a portion of flexible strand proximate an end thereof moves through gap to the hub.

17. The method of claim 14, wherein the winch device is operably coupled to a remote controlled vehicle and wherein the step of effecting movement of the winch device comprises moving the remote controlled vehicle such that the flexible strand moves through gap to the hub.

18. The method of claim 14, wherein the winch device is operably coupled to a remote controlled aircraft and wherein the step of effecting movement of the winch device comprises moving the remote controlled aircraft such that the flexible strand moves through gap to the hub.

19. The method of claim 14, wherein the flexible strand comprises a rope, belt, cable, chain, cord, wire, filament, or straps.

20. A method of taking up a flexible strand using a winch device of claim 1, the method comprising:
   when the spool is in the open configuration, effecting movement of the winch device a first time such that the flexible strand moves through gap to the hub;
   effecting movement of the plurality of posts a first time to closed configuration;
   with the first motor, effecting movement of the plurality of posts to open configuration;
   effecting movement of the winch device a second time such that the flexible strand moves through gap to the hub;
   effecting movement of the plurality of posts a second time to closed configuration; and
   with the second motor, effect axial rotation of the spool about the hub axis causing the plurality of posts to rotate circumferentially about the hub axis such that the flexible strand wraps around the plurality of posts.

* * * * *